June 5, 1956  A. SHOGRAN  2,748,743
OUTBOARD MOTOR REPOSITIONING MEANS
Filed March 27, 1953  6 Sheets-Sheet 1
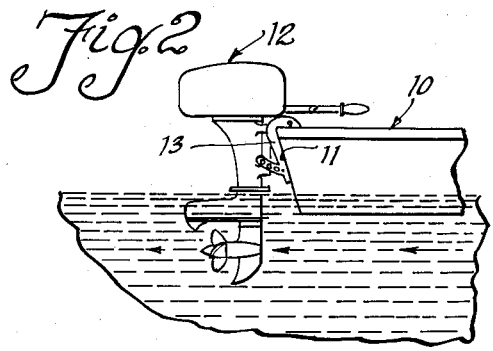
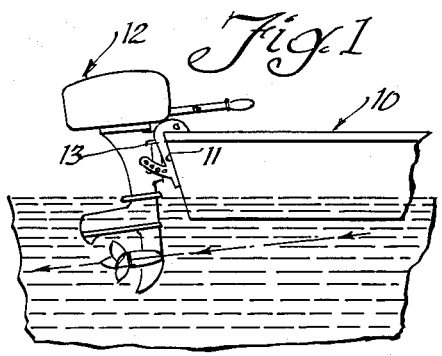
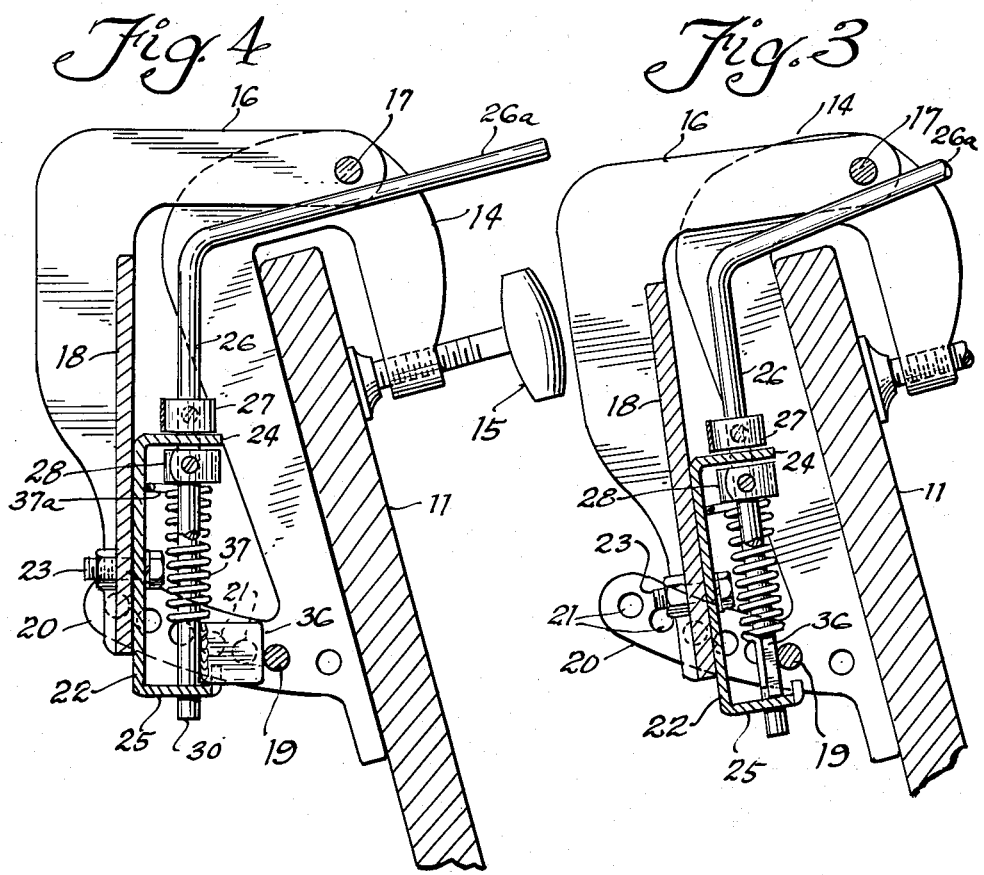
INVENTOR.
Arnold Shogran
BY
Sheridan, Davis & Cargill
Att'ys June 5, 1956 A. SHOGRAN 2,748,743
OUTBOARD MOTOR REPOSITIONING MEANS
Filed March 27, 1953 6 Sheets-Sheet 2
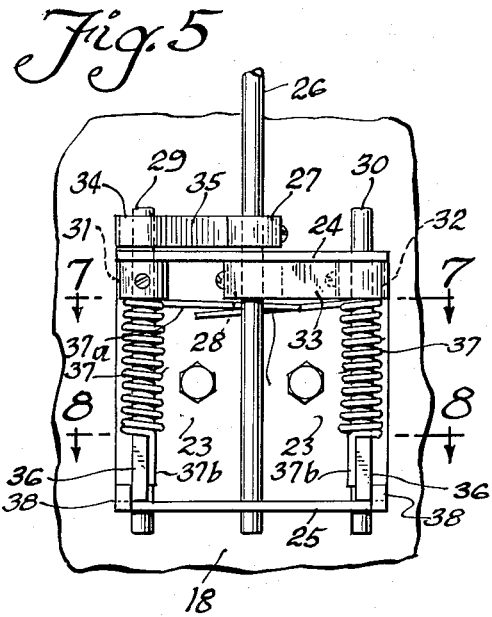
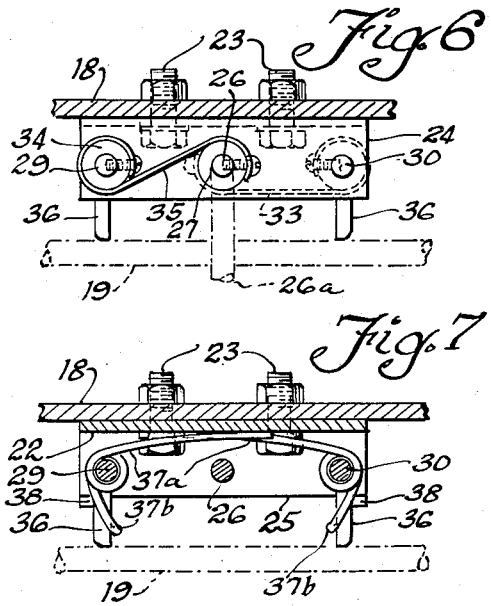
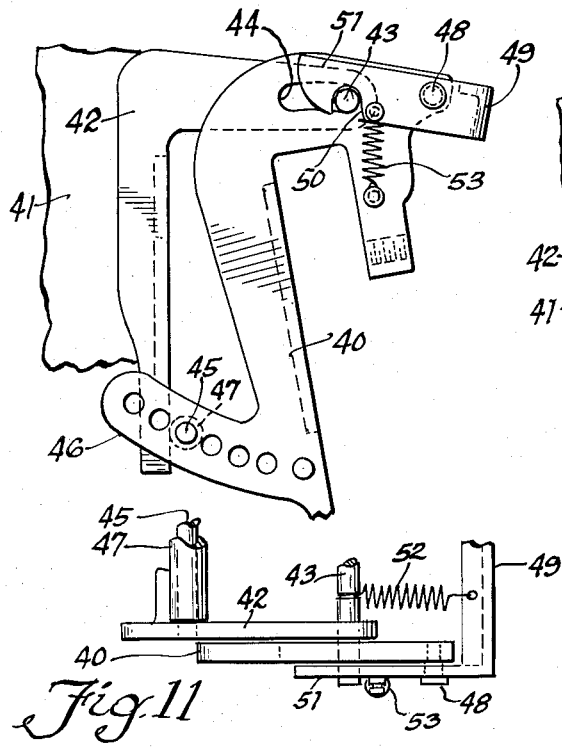
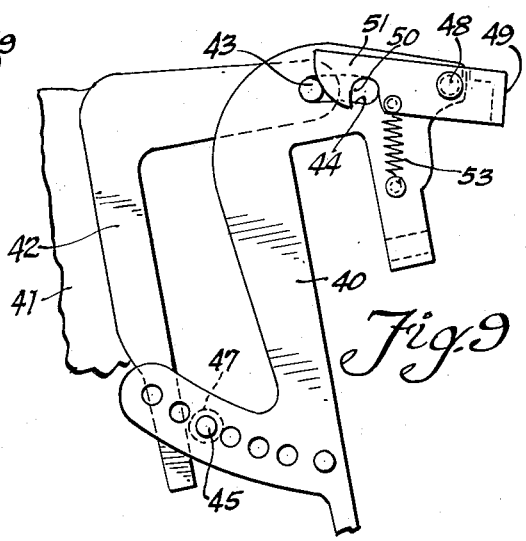
INVENTOR.
Arnold Shogran
BY
Sheridan, Davis & Cargill
Att'ys June 5, 1956     A. SHOGRAN     2,748,743
OUTBOARD MOTOR REPOSITIONING MEANS
Filed March 27, 1953     6 Sheets—Sheet 3
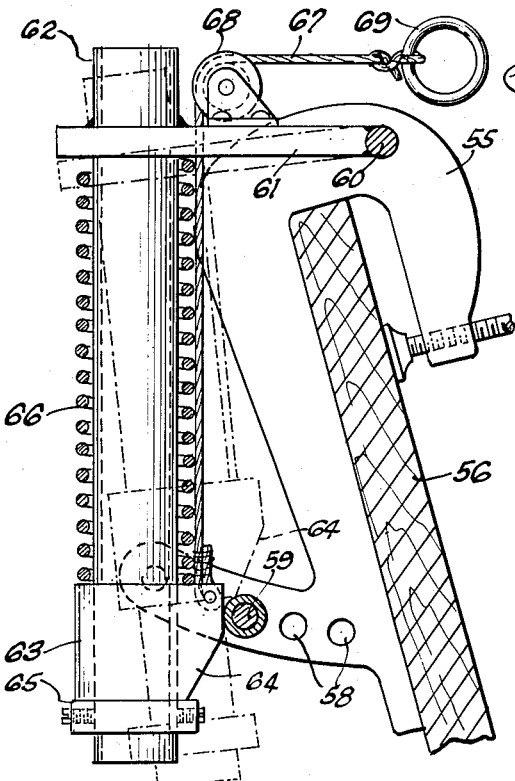
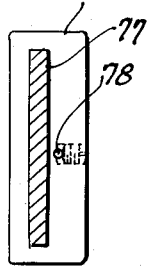
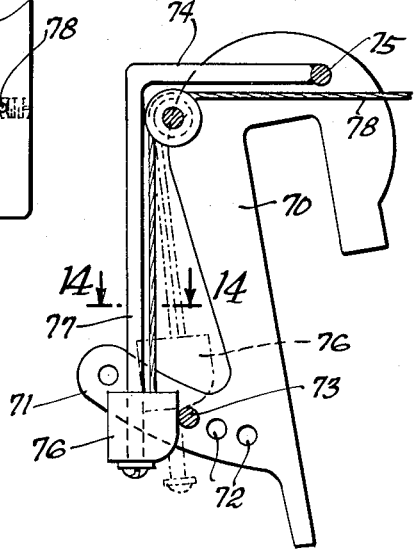
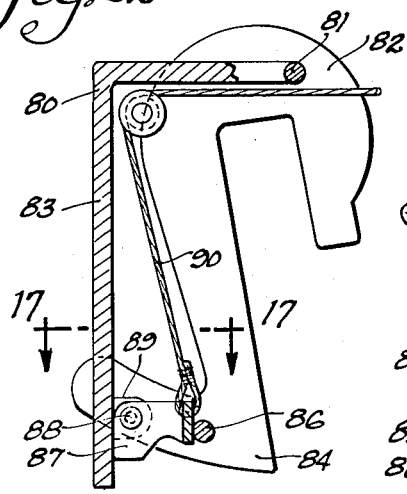
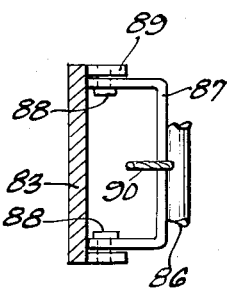
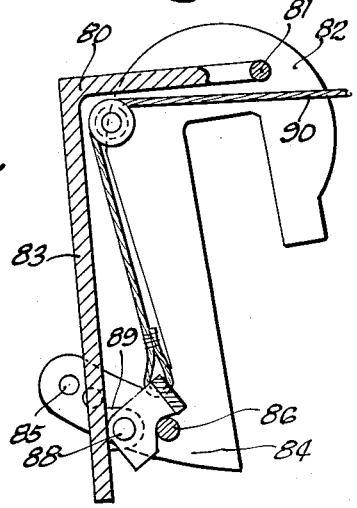
INVENTOR.
Arnold Shogran
BY Sheridan, Davis & Cargill
Att'ys June 5, 1956 A. SHOGRAN 2,748,743
OUTBOARD MOTOR REPOSITIONING MEANS
Filed March 27, 1953 6 Sheets-Sheet 4
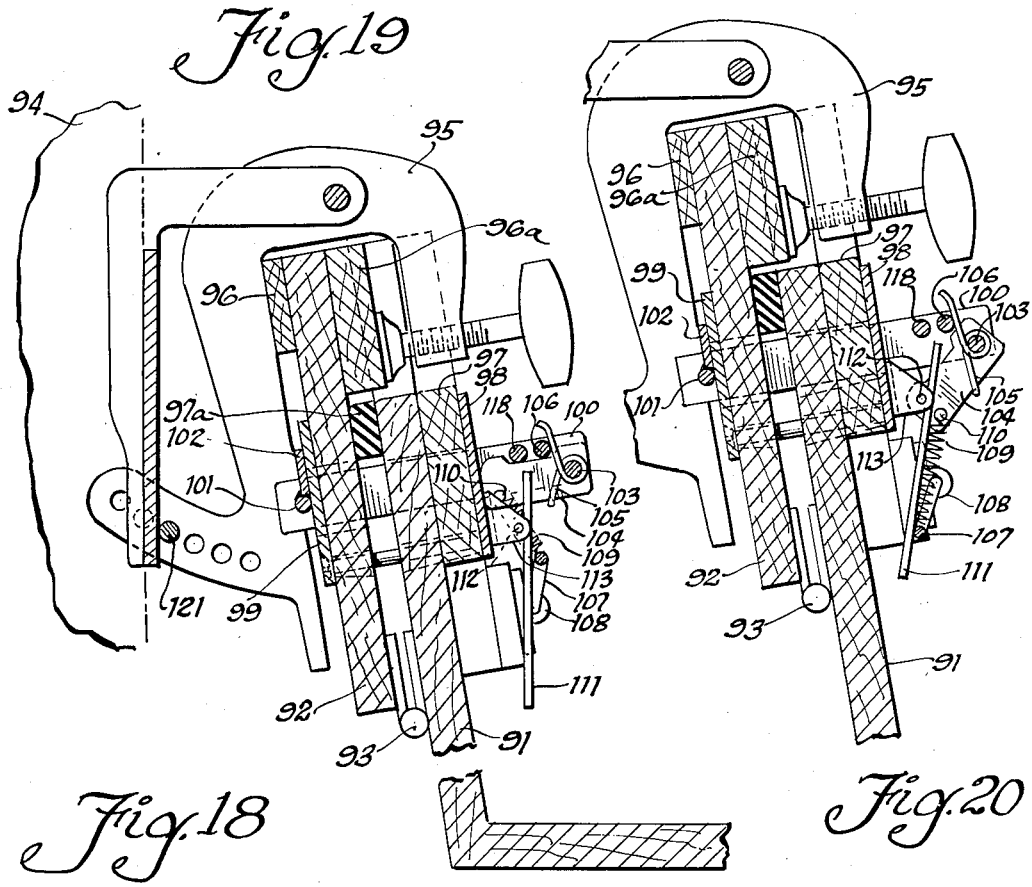
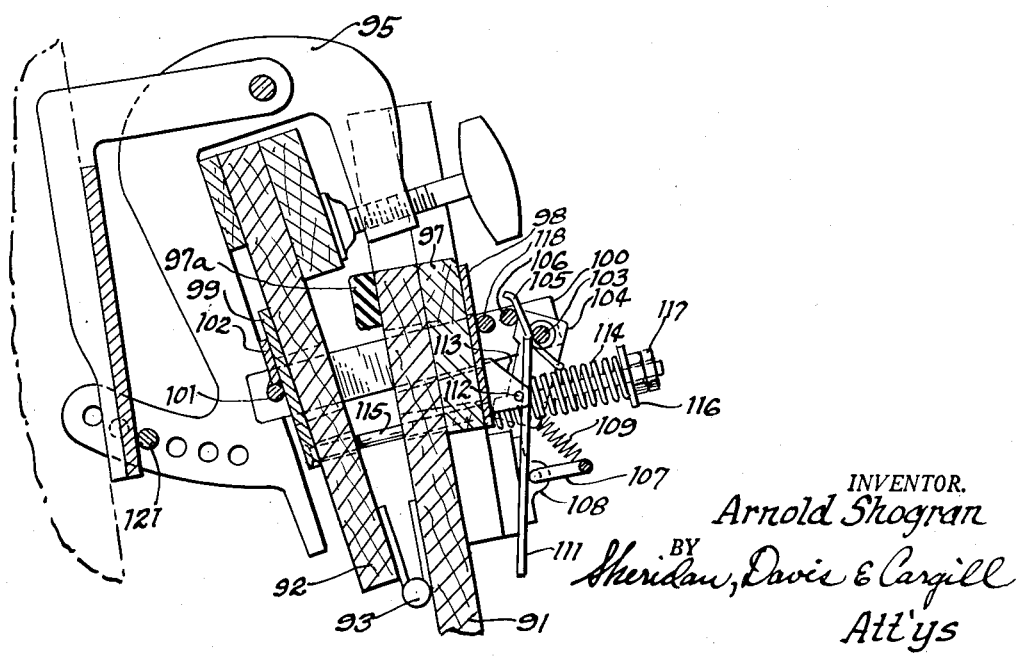
INVENTOR.
Arnold Shogran
BY
Sheridan, Davis & Cargill
Att'ys June 5, 1956  A. SHOGRAN  2,748,743
OUTBOARD MOTOR REPOSITIONING MEANS
Filed March 27, 1953  6 Sheets-Sheet 5

INVENTOR.
Arnold Shogran
BY
Sheridan, Davis & Cargill
Att'ys

June 5, 1956 A. SHOGRAN 2,748,743
OUTBOARD MOTOR REPOSITIONING MEANS
Filed March 27, 1953 6 Sheets-Sheet 6
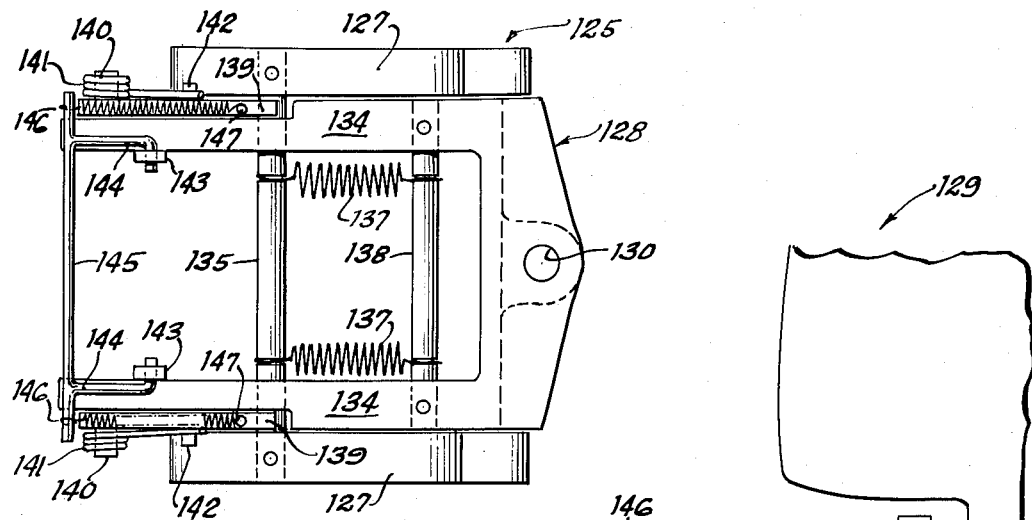
Fig. 23
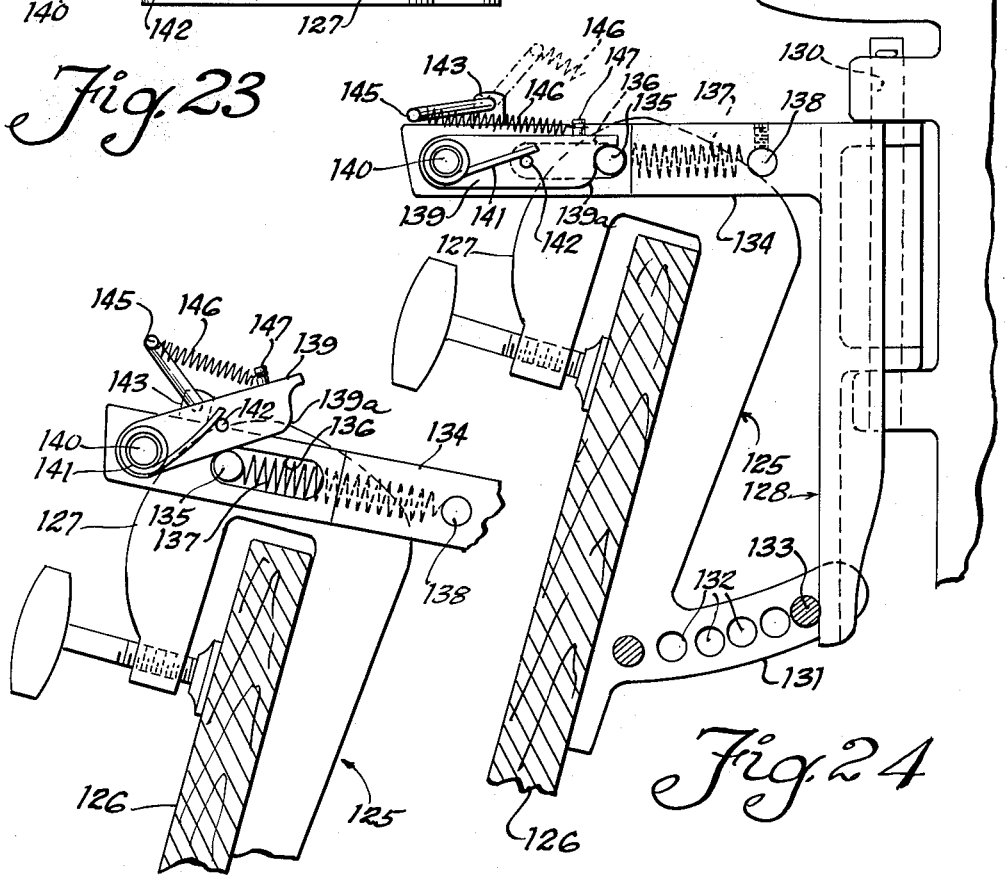
Fig. 24
Fig. 25
INVENTOR.
Arnold Shogran
BY
Sheridan, Davis & Cargill
Att'ys

United States Patent Office 2,748,743
Patented June 5, 1956

2,748,743
OUTBOARD MOTOR REPOSITIONING MEANS

Arnold Shogran, Chicago, Ill.

Application March 27, 1953, Serial No. 345,137

18 Claims. (Cl. 115—18)

This invention relates to outboard motor repositioning means whereby the working position of the motor with respect to a boat can be altered during operating of the motor and boat for procuring a more effective drive or thrust angle of the propeller with respect to the boat for increasing its velocity or for maintaining a given velocity at lower motor speed.

Outboard motors are provided with clamping brackets for clamping the motors to the sterns of boats and have means for adjusting the working angles of the drive shaft casing and thus of the propeller to selected driving positions for propelling the particular boats to which the motors are attached. While the motors and propellers can be swung rearwardly as occasion demands, usually such driving or forward position of a motor cannot be altered without stopping the motor and shifting a stop bar or the like, whereas the present improvements are directed to means which enable the working position of the motor, that is its forward position, and thus the angle of thrust of the propeller, to be changed during operation of the motor, whereby when the boat has reached such a velocity that it tends to level off and to ride higher in the water or to plane, the angular position of the motor with respect to the boat can be altered to change the thrust angle of the propeller to a more advantageous position with respect to the changed position of the boat in the water for increasing the velocity of the boat at a given R. P. M. of the motor.

One object of the present invention, therefore, is to provide means for changing the working position of the motor and consequently the thrust angle of the propeller with respect to a boat during operation of the boat for attaining a more effective thrust angle for increasing the speed of the boat at a given R. P. M. of the motor.

When an outboard motor is attached to the stern or transom of a boat, the weight of the motor tends to lower the stern in the water. The operator usually takes a position near the motor for starting and operating the motor and thus increases the weight at the rear of the boat with the result that the usual boat, such as the outboard type, is lowered substantially at the stern.

If the motor of such a boat is so adjusted that the propeller axis declines in a forward direction, the propeller in operating will tend to lower the rear end of the boat and raise the forward end. By elevation of the forward portion of the boat from the water, the full buoyancy of the boat is not utilized, and the downwardly inclined direction of thrust of the propeller is particularly utilized in maintaining the boat with the forward end elevated and the stern lowered and thus is not wholly utilized in effecting forward movement of the boat.

If the motor angle is so adjusted with respect to the boat as to cause the propeller to exert a horizontal thrust while the boat is in initial inclined position due to the weight at the rear of the boat, that is with a slightly lower rear end and a raised forward end, the forward movement of the boat in the water, especially as considerable velocity is acquired, tends to accentuate rearward inclination by further raising the prow and further lowering the stern. As the velocity of such a boat increases to the point at which the boat rocks forwardly over the water fulcrum that tends to elevate the forward end of the boat, and so levels off in the water with the forward end lower and the rear end higher than in the original position, the angle of thrust of the propeller will be slightly downward and so will tend again to raise the forward end and lower the rear of the boat. Such setting of the thrust angle of the propellers therefore will not afford the greatest velocity of the boat since there is a utilization of motor power in driving the propeller at angles resulting in varying the position of the boat in the water.

If the position of the motor is such initially that the direction of the propeller thrust is slightly upward, it will tend to elevate the rear of the boat and lower the forward end. As the boat reaches a velocity at which it tends to level off and ride higher in the water by rocking forwardly over the water fulcrum, the changed direction of the thrust of the propeller will then tend to further raise the rear end and further lower the forward end of the boat and so utilize a portion of the motor power in again altering the position of the boat in the water. If, as such boat rocks forwardly over the water fulcrum or levels off or planes in the water as just above described, the angle of the propeller is quickly changed so as to exert only or primarily a forward thrust, the entire or substantially the entire output of the motor will be utilized in driving the boat forwardly and thus increase its velocity with the given power output of the motor. Hence, the present improvements are designed to enable the initial angular position of the motor and propeller to be changed quickly as the boat begins to plane for effecting a greater utilization of the output of the motor of the boat to increase the velocity of the boat and retain it in the planing position.

In Figure 1 of the drawing a conventional outboard motor is shown attached to a conventional boat and in an initial position with respect to the boat which is illustrative of the use and operation of the present invention.

Fig. 2 illustrates the motor in a final position to which the motor can be reset, by means of the present improvements, when the boat has attained a desired position of planing in the water after being driven initially with the motor in the position shown in Fig. 1.

Fig. 3 is an enlarged broken vertical sectional view of a repositioning structure which is illustrative of the improvements and shown secured to a portion of the structure of a conventional or common form of outboard motor, the angular position of the motor (not shown in full) corresponding to the position of the motor shown in Fig. 1.

Fig. 4 is a view similar to Fig. 3 but with the repositioning means shown in the driving or working position shown in Fig. 2.

Fig. 5 is a broken elevational view of the repositioning means as viewed from the right in Fig. 4.

Fig. 6 is a plan view of the structure shown in Fig. 5.

Fig. 7 is a sectional view taken on line 7—7 of Fig. 5.

Fig. 8 is a sectional view taken on line 8—8 of Fig. 5.

Fig. 9 is a side elevational view of a modified form of repositioning means shown in conjunction with a transom clamp of the motor and the motor supporting bracket pivotally attached to the clamp, the angular position of the clamp suggesting a motor position corresponding to that shown in Fig. 1.

Fig. 10 is a view similar to Fig. 9 but illustrating the parts in the operated position of the motor corresponding to the motor position shown in Fig. 2.

Fig. 11 is a broken plan view of the structure shown in Fig. 10.

Fig. 12 is a broken end elevational view of another form of repositioning means shown in conjunction with the associated portions of an outboard motor and boat transom, the figure illustrating the parts of the repositioning means in inoperative position in dotted lines and in operative position in full lines.

Fig. 13 is a view similar to Fig. 12 but illustrating a gravity operated repositioning means.

Fig. 14 is a sectional view taken on line 14—14 of Fig. 13.

Figs. 15 and 16 are side elevational views of a further modification of the repositioning means in inoperative and operative positions, respectively.

Fig. 17 is a sectional view taken on line 17—17 of Fig. 16.

Fig. 18 is a side elevational view, partly in section, of a modified repositioning means for cooperation with a panel hinged to the rear of a boat transom and on which panel a conventional outboard motor is attached, the repositioning means being shown in a latched position for enabling the motor to assume a position corresponding to that shown in Fig. 1.

Fig. 19 is a view similar to Fig. 18 but showing the parts in a spring retracted and latched position for disposing and holding the motor in a position corresponding to that shown in Fig. 2.

Fig. 20 is a view similar to Fig. 19 but with the latching means thereof released to enable the motor to assume a position corresponding to the position of the motor of Fig. 1.

Fig. 23 is a broken plan view and Figs. 24 and 25 are side elevational view of a modified structure.

Figure 21:
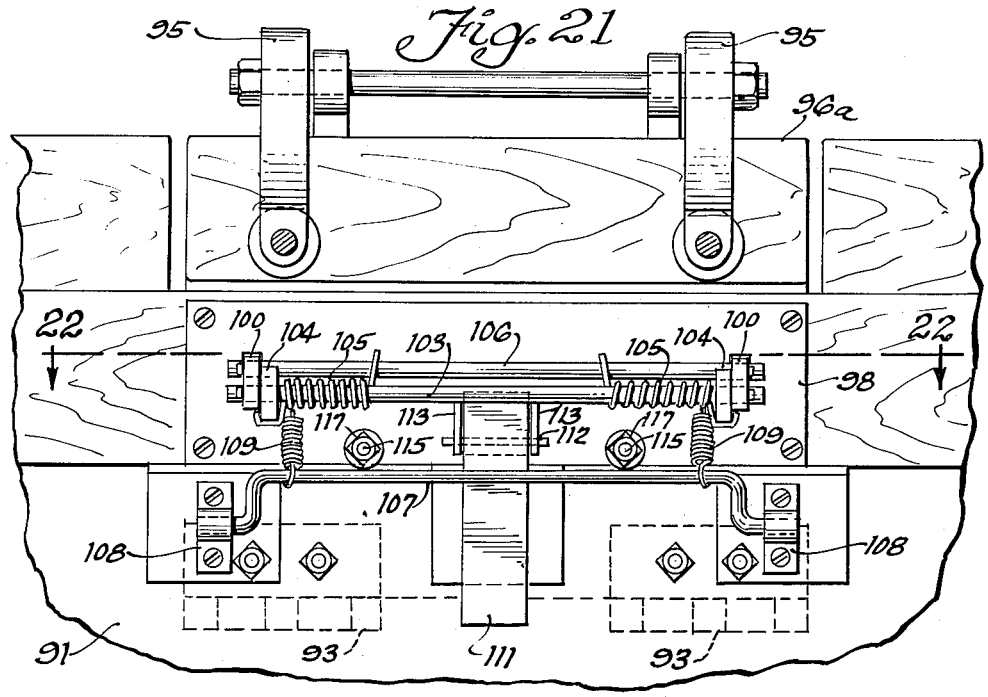
Fig. 21 is a broken elevational view looking to the left of Fig. 19.

Figs. 1 and 2 of the drawing illustrate fragmentarily a conventional boat 10 of the rowboat type, having a rear wall or transom 11 to which an outboard motor 12 is removably attached by a clamp 13. The clamp usually has two integrally connected spaced apart members 14, each of general C form, and a pair of cooperating hand operable clamp screws 15 which secure the motor to the boat. The casings of such motors have forwardly projecting brackets or the like 16 to which the clamps are pivotally connected at 17. The brackets 16 may be formed integrally with the motor casing or secured to the casing so as to form a rigid portion thereof. The forward face of the bracket, as shown in Figs. 4 and 5, may be in the form of a flat web 18. It will be appreciated that the forms or shapes of the casing, the brackets, and clamps are different in different makes of outboard motors, but all such motors have clamps for attachment to the transoms of boats and to which clamps the motor casings are pivotally connected and about which pivots the motors can swing when the lower portion of such a motor casing or propeller engages a submerged obstacle such as a rock or log. The motors can likewise be swung manually in the same direction, when desired, for elevating the propellers.

As a propeller is driven by the motor it tends to move forwardly and to swing the motor casing arcuately about the pivot pin 17, as viewed in Figs. 1 to 4, inclusive, until the casing is arrested in a selected driving position. In Figs. 3 and 4 a conventional stop is shown as comprising a rod or pin 19 positioned in a pair of openings in rearwardly directed arms 20 of the clamp 13. Abutments on the bracket or on the motor casing engage the pin 19 as the motor casing swings forwardly and arrests the swinging action in a position determined by the location of the pin. In Figs. 3 and 4 the arms 20 are shown with a series of holes 21 for receiving the stop pin in different positions for arresting forward swinging movement of the motor casing in a desired operating or working position. Such analogous means are required in view of the fact that the transoms of boats are not of uniform disposition with respect to the vertical, for example, and so relocations of a pin 19 may be necessary as a motorist attaches the motor to different boats.

The form of the improvement shown in Figs. 3–8, inclusive, is such that it can be attached to a motor bracket of the type shown in Figs. 3 and 4. It will be obvious that the improvements may be attached to brackets differing from that specifically illustrated but in some instances may require some modification as to form or size.

The repositioning device shown in Figs. 3–8 comprises a mounting plate 22 shown with flanged upper and lower ends. The plate is shown attached to the web 18 by bolts 23. The upper and lower flanges 24 and 25 of the plate, as shown in Fig. 5, have central openings through which projects a rockable hand operating shaft 26. A pair of collars 27, 28 on the shaft on opposed sides of the flange 24 hold it against displacement from the openings in the flanges.

A pair of shafts 29, 30 are also received each in a pair of vertically aligned openings in the flanges and are shown as being provided with collars 31 and 32 secured thereto beneath the flange 24. A flexible metal strap 33 is secured at its ends by screws to the collars 28 and 32 whereby rotary movement of the shaft 26 will be transmitted to the other shaft. The shaft 29 has secured thereto a collar 34 horizontally aligned with the collar 27. A flexible metal strap 35 is secured at each end by screws to each of the collars 27 and 34 and is so arranged that clockwise rotary movement of the shaft 26, as viewed in Fig. 6, will produce counterclockwise movement of the shaft 29 while, by means of strap 33, the shaft 26 will produce clockwise rotary or arcuate movement of the shaft 30. As indicated in Figs. 3 and 4 the upper portion of the shaft 26 is bent forwardly to provide a lever 26a which extends over the top of the boat transom 11 between the clamp arms 14 where it is readily accessible to the operator within the boat. The lower portion of each of the shafts 29, 30 has secured thereto, as by welding, a spacer or motor positioning member 36, which members are movable with the shafts 29 and 30 between the inoperable positions shown in Fig. 8 to the operable positions shown in Fig. 6.

On each shaft 29 and 30 is a helical spring 37 each having an upper end 37a seated against the plate 22 and a lower end 37b in engagement with the respective spacer element 36. The springs 37 are under tension and tend to swing the shafts 29, 30 for moving the spacers 36 from the inoperative positions shown in Fig. 8 to the operative positions shown in Fig. 6. Abutments 38 are shown at each end of the lower flange 25 against which the spacers 36 abut to arrest the spring activated movements thereof in the operable positions shown in Figs. 6 and 7.

Swinging the hand lever 26a clockwise as viewed in Fig. 6 will wind the straps or belts 33 on the respective collars 27 and 28 of the shaft 26 against the action of the springs 37 and swing the spacers or positioning members 36 to the inoperable positions shown in Fig. 8. The springs will, upon manual release of the lever, snap the spacer member 36 to the operative position unless otherwise restrained.

When an outboard motor has been attached to a boat as indicated in Fig. 4, the springs 37 normally will swing the spacer members 36 to the operative or outward position wherein they will abut, or be aligned with the pin 19 to abut it, when the motor is started. The pin is in holes so located and the spacer members 36 are of such length that the motor casing will be in the position suggested in Fig. 2 when the spacer members 36 are in the outward position. Upon the starting of the motor the lever 26 is operated to swing the spacer members 36 to the inoperative position shown in Fig. 8 whereupon the operating propeller will swing the motor to the position shown or suggested in Fig. 1. This position corresponds to that shown also in Fig. 3. The forward thrust of the propeller will hold the spacer members in this inoperative position. The axis of the propeller shaft in this initial position is inclined whereby the angular disposition of the propeller of the thrust angle is slightly upward. As the boat moves and gains velocity, the forward end of the boat usually rises higher from the water notwithstanding that the thrust angle of the propeller tends to raise the rear end of the boat. At some particular velocity of the boat, dependent on its size and shape and load, it will tend to level off in the water to a planing position, as when the center of gravity moves forwardly over the water fulcrum. At this point in the acceleration of the boat, the operator turns the fuel feeding device of the motor for momentarily reducing the driving effort of the motor whereupon the motor, due to the lagging action, will swing clockwise, as viewed in Fig. 1, and release the spacing member 36 from the position shown in Fig. 8 to enable the springs 37 to swing the spacing members to the forwardly projecting position of Fig. 6. Restoring the fuel feed to the previous position effects acceleration of the motor but the motor casing and propeller will now be held by the spacing members in the relative position shown in Figs. 2 and 4, that is, a position wherein the direction of thrust of the propeller is more nearly, or quite parallel to, the surface of the water. When in such position the driving force of the driven propeller is wholly or substantially in a direction to increase the speed of the planing boat, as compared with the former relatively angular lifting position, and so the velocity of the boat is increased with the motor operating at no greater R. P. M. than formerly.

It will be obvious that the duration of decreased fuel feed to cause the described relative rearward swinging of the propeller and motor casing for releasing the spacer members 36 for movement to the operative positions as just above described is but a second or two and no appreciable loss in velocity of the boat occurs. Hence when a boat has reached the planing position at which it levels off and rides high in the water the quick change in the direction of the propeller thrust as descried enables the motor, by reason of the more effective direction of the propeller thrust, to increase the velocity of the boat. The angular position of the propeller as shown in Fig. 1 tends to lift the rear portion of the boat and lower the forward end, which action of the propeller reduces the period which would be required for a given motor operating at a given R. P. M. to cause a particular boat to begin to plane, that is, for the forward end to lower from an elevated position and the rear end to rise and the boat as a whole to level off or approach that condition. By reason of the mechanism described, a given motor and boat can be brought to the planing position in less time and so reach the position in the water wherein the motor can exert a greater portion of, or all of, its thrust directly forwardly and so drive the boat at maximum velocity than can the same motor operating at a corresponding R. P. M. and driving the same boat but where the thrust angle of the boat is not alterable from a conventional operative position, such as that shown in Fig. 2, for example.

It will be appreciated that in instances where the angle of the boat transom is different from that shown in Figs. 2 and 3, for example, for attainment of the best results in the use of the device above described, the stop pin 19 may require relocation or that the spacer members 36 should be longer or shorter than those shown.

In Figs. 9–11, inclusive, a different form of device is illustrated for performing the functions of the device above described. The clamp arms 40 of an outboard motor 41 are pivotally attached to the bracket 42 for swinging movement about the pivot rod 43 of Fig. 10. The arms 40 are provided with arcuate slots 44 into which the ends of the pivot pin or rod 43 project and which enable the motor and the bracket to move from the position shown in Fig. 10 to the position of Fig. 9 when not restrained in the position of Fig. 10 by a latch means to be described. Such pivotal or rocking action occurs about the axis of a stop pin 45 carried in openings in arms 46. The pin preferably is provided with a roller 47 to reduce friction between the pin and the contacting portion of the bracket 42. The pin 45 can be relocated in any of the pairs of openings provided for arresting the motor in a forwardly swing operating position. Pivotally secured to the clamp arms for tilting movement about the axis of the opposed pivot pins 48 is a U-shaped latch member 49 having latching recesses 50 in the arms 51 for receiving the ends of the pin 43 carried by the bracket 42. A tensioned spring 52 is shown connecting the latch member 49 to the pin 43, but two or more such springs will be employed as may be necessary. Springs 53, one at each end of the latch member (one only being shown) restores the latch to operative position following manual tilting operation of the latch 51 to release the pin 43.

When the motor 41 has been attached to a boat transom and has been started by the operator within the boat, he can depress the latch member 49 to move it in a clockwise direction about the pivot pins 48 against the action of springs 53, as viewed in Fig. 10 for releasing the latch pin 43 from engagement within the latching recesses 50. The forward thrust of the motor (to the right as viewed in Figs. 9 and 10) will swing the unlatched motor counterclockwise, as viewed in Fig. 10, to the position shown in Fig. 9. During such movement the pin 43 carried by the bracket 42 moves rearwardly within the slots 44 from the dotted line position to the full line position shown in Fig. 9. The springs 52 are of such number and strength as not to prevent the force exerted by the propeller from effecting such swinging movement. The forward position of the motor and its propeller is determined by the position of stop pin 45 and that position is such as to enable the motor to assume an initial operative position such that the propeller thrust will tend to raise the rear of the boat and lower the forward end, as above described.

When the boat reaches a velocity at which it begins to plane, the fuel supply is momentarily reduced to slow down the propeller rotations and by the resulting drag of the portion of the motor drive shaft casing and propeller within the water and the action of the springs 52, the motor casing tilts or rocks clockwise as viewed in Fig. 9 to the position shown in Fig. 10, in which latter position the axis of the propeller thrust is parallel to or more nearly parallel with the surfaces of the water and hence, following the restoration of the former rate of fuel feed, the motor will drive the boat at a greater velocity. The latch 49 is restored by the springs 52 to latch the pin in the position of Fig. 10.

In Fig. 12 a further modification of the invention is illustrated. In this figure the clamp member 55 is shown clamped to a transom 56 of a boat. The clamp has rearwardly projecting arms 57 having openings 58 for receiving in a selected position a stop bar 59 which limits the forwardly swinging of the motor and thus the normal working position of the propeller (not shown) within the water. To the clamp is pivotally attached at 60 by means of a forwardly extending arm or plate 61, the shaft casing 62 of the outboard motor, the casing 62 being shown as cylindrical in conformity with such members of some conventional outboard motors.

Mounted on the casing 62 for vertical sliding movement thereon is a spacer or blocking member 63, the forward portion 64 of which is adapted to contact the stop bar 59 when the member 63 is in the lowermost position. A collar 65 is shown on the casing 62 for arresting downward movement of the member 63 beyond its operative position shown in full lines.

A helical compression spring 66 is shown on the casing between the member 63 and the plate 61 and exerts downward pressure on the member 63. A flexible cable or cord 67 or the like is attached to the spacer member 63 and passes over a pulley 68 shown secured to the the plate 61 and at its forward end is provided with a finger grip or ring 69.

From the above description, it will be seen that by pulling on the cable to the right by the operator within the boat, the spacer or blocking member 63 can be raised against spring pressure to the dotted line position indicated, and when in such elevated position the blocking member will enable the casing 62 to be swung by the driven propeller against the stop bar 59. Such position of the motor relative to the boat may constitute the initial or starting position and when the boat has reached such velocity that it is in a planing position, the slowing down of the propeller shaft by reducing the motor velocity as above described will reduce the forward thrust of the propeller and result in its being swung rearwardly, relatively, about the pivot 60 and enable the spring 66 to press the spacer 63 to the lowermost or full line position. Upon opening the motor throttle for full speed, the spacer retains the motor in the full line position indicated and thus retains the propeller in a position for exerting a thrust more nearly or quite parallel with the surface of the water for driving a boat at a maximum velocity.

It will be understood that the forward thrust exerted by the propeller in normal operation is sufficient to hold the spacer or blocking member 64 in the raised position indicated in dotted lines when the member 64 has been manually raised to that position, but that upon reduction of the fuel feed to the engine to slow it down momentarily, the spring 66 will force the member 64 to the lower full line position wherein it contacts the stop bar 59, or the anti-friction roller 69 thereon, for retaining the propeller in a position relative to the boat for producing a driving thrust in a direction calculated to increase the speed of the boat.

In the modification of the invention shown in Figs. 13 and 14 a clamp 70 is shown for securing an outboard motor to a boat and has rearwardly directed arms 71 provided with openings 72 for receiving a stop bar 73. A bracket 74 by means of which the motor is attached to the clamp 70 is pivotally attached to the latter at 75.

A gravity operated spacer or blocking member 76 is slidably mounted on the upright portion 77 of the bracket 74 and can be raised or lowered between operative and inoperative positions on the bracket portion 77. In Fig. 13 the blocking member 76 is shown in dotted lines in inoperative or raised position and in operative position in full lines, the member being moved from the lower operative to the elevated inoperative position by means of a flexible cable 78 manually operable by the operator in a boat. The structure shown in Fig. 13 functions in the same manner as the structure shown in Fig. 12 except that gravity is relied on for lowering the member 76 in the structure shown in Fig. 13.

In the structure shown in Figs. 15, 16, and 17 a conventional motor bracket 80 is pivotally attached at 81 to the clamp 82, the bracket having a depending plate-like portion 83 similar to the bracket shown in Fig. 13. The clamp has rearwardly extending arms 84 provided with openings 85 for receiving a stop bar 86 in selected positions. In the present embodiment a blocking member 87 of U-shape is shown pivotally attached at 88, 88 to ears 89 provided on the forward face of the portion 83 of the clamp and at an elevation whereby when the blocking member is in the lowered position shown in Fig. 16 it will engage the stop bar 86 for holding the bracket and the motor secured thereto in the operating position shown. When the blocking member has been elevated about the pivot by the operator by means of the cable 90, the bracket and motor can move pivotally to the position shown in Fig. 15. Fig. 15 illustrates the starting position wherein the motor and propeller will be in the position, relative to the boat, suggested by Fig. 1. Upon the boat attaining a planing position, the fuel feed is momentarily interrupted to cause the motor to swing relatively away from the boat whereupon the blocking member, by gravity or by spring action, moves to the position of Fig. 16 for the purpose above described.

Figure 22:
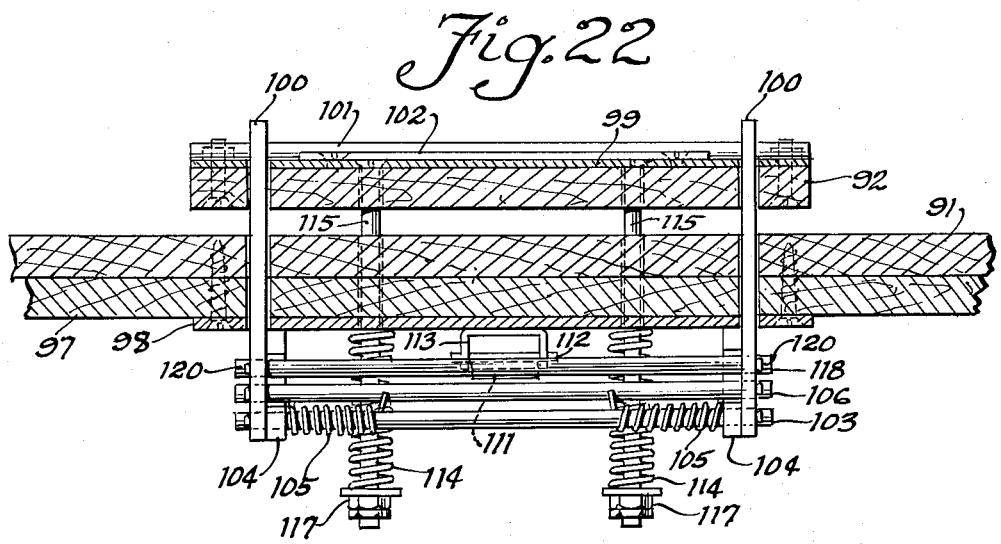
Fig. 22 is a sectional view taken on line 22—22 of Fig. 21.

In the structure shown in Figs. 18–22 a further modification of the invention is shown wherein the operative structure for performing the angle changing function is attached to the boat rather than forming a part of or attachment to an outboard motor. Thus any conventional outboard motor which normally is clamped to the transom of a boat can be attached by the clamping means of the motor to the present improvements which are operable to alter the angles of the motor and the direction of its thrust axis to the boat.

As illustrated in the drawing, the transom 91 of a boat has attached to the rear thereof a motor mounting plate 92. The attaching means shown are hinges 93 which provide for pivotal movement of the plate between the rearwardly tilted position shown in Fig. 18 to the forward position shown in Figs. 19 and 20 wherein the plate is substantially parallel with the transom. A rubber bumper is shown at 97a.

The plate 92 may be of metal if desired, but that shown in the drawing is of wood. To the upper portion of the plate the outboard motor, indicated generally by numeral 94, is attached by the conventional clamping means 95. The clamping means shown is for illustrative purposes since any conventional outboard motor having clamping means for securing the motor to the transom of a boat may be secured to the hinged plate 92 which in the drawings is shown provided with strips 96 and 96a, the former for spacing purposes and the latter for strengthening the plate.

The top portion of the mounting plate 92 to which the motor is clamped should be at an elevation for effecting the proper location of the propeller in the water. In some instances, where the boat has a low transom, the plate can be so mounted as to extend above the transom, but usually the transoms of boats are at the correct or approximately correct height for accommodating attachments of outboard motors and in such instances the upper central portion of the transom should be cut away to accommodate the forward portion of the clamp, as indicated in the drawings.

The transom 91 is shown provided with a rubber bumper 97a and with a horizontal re-enforcing strip 97 along opposed sides of the upper edge of the transom cut out, above mentioned. To the forward face of the strip 97 is secured a metal wear resisting plate 98. A metal plate 99 is also secured to the rear face of the mounting plate 92 since the latter is shown as being of wood. Apertures are provided in the plate 99 and registering apertures are provided in the motor mounting plate 92, transom 91, strip 97 and wear plate 98 for accommodating a pair of pivotally mounted bars 100 which are retained in position, in the structure illustrated, by a rod 101 which passes through apertures in the bars and is secured to the plate 99 by any suitable means, such as by a strap 102 to which the intermediate portion of the rod is welded and the strip either welded to the plate or secured thereto by screws. The rod 101 provides pivotal anchorage for the bars 100 which are movable slightly in the accommodating apertures.

The bars 100 project inwardly of the boat through its wear plate 98 as shown and at the projecting ends is a transverse rod 103 on which are pivotally mounted a pair of swingable latch members 104 which when in the latching position shown in Fig. 19 prevent rearward swinging movement of the mounting plate 92.

The latch members are provided each with a spring 105 having one arm engaging the lower edge of the respective latch and the other end in contact with a second rod 106 carried by the projecting ends of the bars 100. The springs are under tension and tend to move the latch members clockwise from the position shown in Fig. 18 to the latched position of Fig. 19.

Means are provided for swinging the latch members 104 concurrently against the action of the respective springs 105 from the latched to the unlatched position to enable the mounting plate 92, and the motor mounted thereon to move from the position of Fig. 19 to that shown in Fig. 18. The means mentioned comprises a U-shaped or bail-like latch-operating rod 107 having the oppositely directed ends thereof pivotally supported by brackets 108 which are secured to the inner surface of the transom. Springs 109, each attached at 110 to one of the latch members adjacent the end remote from the pivotal axis defined by the rod 103 and the other ends of the springs attached to the latch operating rod 107, will pull the latch members downwardly from the latching position shown in Fig. 19 to the position shown in Fig. 20, as the operating rod 107 is manually swung clockwise from the position shown in Fig. 19 to the position shown in Fig. 20. In the movement of the latch operating rod 107 to the position shown in Fig. 20 as just described, the horizontal portion of the rod to which the lower ends of the springs 109 are attached passes through the plane common to the other ends of the springs and the pivotal axis of the bars and thus will remain in the position shown in Fig. 20 until the bar is again swung counterclockwise past the dead center portion. The strength of the springs 105 is such, relative to the strength of the springs 109, that the latter can swing the latch members 104 counterclockwise from the position shown in Fig. 19 to an inclined position such as indicated in Fig. 20 in which latter position the springs 105 resist such further swinging movement. It will be observed that as the latch operating member 107 is moved to the position shown in Fig. 20, it engages the lower portion of a trigger member 111 which is pivotally supported by and normally hangs pendent from an axis 112 provided by a pair of supporting brackets 113 located on the plate 98 in the disclosed structure. The upper end of the trigger member 111 extends into the path of movement of the supporting rod 103 of the latches and will be engaged by the rod as the plate 92 and the bars 100 are moved to the left from the position shown in Fig. 20 to the position shown in Fig. 18 and thereby shift the U-shaped latch operating bar 107 counterclockwise past the dead center position whereupon the springs 109 will snap the bar to the position shown in Fig. 18. In the position of the parts shown in Fig. 18 it will be seen that upon return of the motor mounting plate 92 to the position shown in Fig. 19, the springs 105 can restore the latch members to the operative positions shown in the latter figure for locking the plate 92 in the position shown in said figure.

For the purpose of positively restoring the mounting plate 92 from the position shown in Fig. 18 to the position illustrated in Fig. 19, two helical compression springs 114 are shown in Fig. 18 mounted on bolts 115 which extend through apertures of ample diameter to enable the bolts to accommodate the arcuate movement taken by the mounting plate 92. As shown, the heads of the bolts 115 are located at the rear face of the plate 92 and extend forwardly through apertures in the transom. A spring 114 is secured in compression when the plate 92 is in the position shown in Fig. 19. The springs are further compressed upon movement of the plate 92 to the position of Fig. 18.

The cooperative functioning of the parts of the mechanism shown in Figs. 18–22 will now be described. If the parts of the mechanism are in the positions shown in Fig. 19 as the motor is started, the relation of the motor and propeller to the boat will correspond to that shown in Fig. 2, but inasmuch as the boat will, under the usual conditions assumed, ride considerably lower in the water at the rear end than at the forward end, the line of thrust exerted by the propeller will not be such as to tend materially to elevate the rear end of the boat to a planing position. Hence, under the assumed conditions, the operator will swing the latch releasing member 107 from the position shown in Fig. 19 to the position shown in Fig. 20 wherein the latch members 104 are lowered from latching position. The thrust exerted by the propeller will thereupon swing the motor 94 and the mounting plate 92 counterclockwise from the position shown in Fig. 20 to the position shown in Fig. 18 wherein the stop rods 118 carried by the bars 100 contact the plate 98 and arrest further swinging movement. Such swinging action of the plate 92 compresses the springs 114 by reason of the rearward movement of the bolts 115. As the pivot rod 103 engages the upper end of the trigger 111 and moves the lower end thereof to the right or in a counterclockwise direction, the trigger will swing the latch operating member 107 counterclockwise past dead center whereupon the springs 109, in contracting, will move the member 107 to the free position shown in Fig. 18. The position of the motor indicated in Fig. 18 corresponds in its functioning thereof to the position shown in Fig. 1 wherein the propeller exerts a thrust which tends to lift the rear end of the boat to a planing position in the water.

As the boat reaches a speed wherein it levels off in the water, the operator reduces the speed of the motor momentarily by partially closing the throttle, whereby, by reason of the reduction in the force of the thrust of the propeller, the springs 114 will expand and force the plate 92 and the motor mounted thereon in a clockwise direction from the position shown in Fig. 18 to that shown in Fig. 19. Concurrently with the movement of the plate 92 to the position shown in Fig. 19, the springs 105 will snap the latch members 104 to the position shown in Fig. 19 whereby the parts are latched in the position of Fig. 19 and resist subsequent tilting action of the plate 92 and motor 94 to the position of Fig. 18 as the throttle is again opened to provide maximum forward velocity.

The stop bar 118 which limits the rearward cocking movement of the motor in the position shown in Fig. 18, can be removed after removing a cotter pin 120 or other fastening means, to enable the motor and tilting plate 92 to tilt further to the left than is shown in Fig. 18 whereby the thrust angle of the propeller will be more sharply inclined and the upward component of the propeller force will be greater. The rod 106 will in such instance consttiute a stop bar for limiting the tilting movement of the motor. Such adjustment may be found desirable depending on the load in the rear of the boat including the weight of the motor or the boat characteristics.

Where the inclination of the boat transom is different from that shown in Fig. 18, it may be necessary to adjust the position of the conventional stop rod 121 or the equivalent element to a compensating position to procure the desired directional thrust of the propeller when the mechanism is in the locked up planing position indicated in Fig. 19.

In Figs. 23, 24 and 25 a structure is shown which acts atuomatically to latch the motor and propeller in the high speed position corresponding to that shown in Fig. 2 and which, after a manual resetting of a tensioning means while the structure is in the high speed position will, as explained below, automatically release a latching means and permit the motor to move to the position corresponding to that indicated in Fig. 1.

In said figures, the motor clamp is indicated generally by numeral 125 and is adapted to be clamped to the transom 126 of a boat in mounting the motor in operative position. The clamp has forwardly extending spaced apart arms 127 between which is located a tiltable bracket 128 to which the motor 129 is pivotally attached for swinging movement in steering, as about an axis 130, in a conventional manner. The clamp comprises a pair of rearwardly directed arcuate arms 131 pivoted with transversely aligned pairs of openings 132 in any pair of which a stop rod or bar 133 may be located for arresting forward swinging movement of the motor, that is, for arresting it in a selected forward or initial position as suggested in Fig. 1.

The bracket 128 has a pair of forwardly extending arms 134, pivotally attached to and supported by the clamp arms 127 by a rod 135. The bracket arms 134 are provided with transversely aligned slots 136 through which the rod passes and which enable the bracket to shift forwardly or rearwardly, as explained below, as the motor structure rocks about the stop rod 133 as a pivot. As the bracket shifts rearwardly or to the right from the position shown in Fig. 24 to the position shown in Fig. 25 (the latch members next described being raised from the latching position shown in Fig. 24), springs 137 attached at the forward ends to the rod 135 and at the rear ends to a cross bar 138 carried by the arms 134, are tensioned. In other words, such shifting is against the action of the springs 137 which tend to swing the bracket and motor counterclockwise as viewed in Fig. 25.

Pivotally attached to the bracket arms 134 are latches or dogs 139, the latches being mounted on studs 140. A spring 141 for each latch is secured at one end to the respective stud and at its free end bears against a pin or stud 142 on the catch and thus tends to swing the latch downwardly to the position shown in Fig. 24. The lower rear end portion of the latch is curved as indicated at 139a and functions as a cam to urge the latch upwardly from a partially raised position during the functioning of the structure, as later described.

Each of the bracket arms 134 is provided with an upright support 143 within which are pivotally mounted the inturned ends of arms 144 of a manually operable lever 145. Coil springs 146 are secured under tension each to one end of the lever and each to an upright stud 147 secured to a latch member 139 and tend to lift the latches from the latching position shown in Fig. 24 against the action of the respective spring 141. The springs 146, when tensioned, are of sufficient strength to lift the latches against the action of springs 141 when the latches are momentarily released from pressure against the rod 135.

In Fig. 25 the latches 139 are shown elevated and the lever 145 is also elevated and the springs 146 contracted. The bracket 128 and bracket arms 134 are shown shifted to the right in Fig. 25 from the position shown in Fig. 24. In such shifted position the motor and propeller are in the inclined starting position corresponding to the position indicated in Fig. 1. As the boat speed increases to the velocity where it begins to plane with the motor 129 in the inclined position suggested in Fig. 1, the momentary reduction of speed of operation of the motor and propeller caused by reducing the fuel feed will, by reason of the action of the distended springs 137 and the water drag on the motor and propeller, cause the motor to swing or rock counterclockwise about the stop bar 133 as a pivot and thus swing the bracket 128 from the position shown in Fig. 25 to the position shown in Fig. 24. The springs 141 will thereupon snap the latches to the operative position shown in Fig. 24 and thus retain the motor against clockwise tilting as the gas supply to the motor is restored. Thus when the boat begins to plane with the motor in the relative position of Fig. 25, a momentary reduction in the fuel feed causes the motor to shift to the position of Fig. 24 (or Fig. 2) and to be latched automatically in that position.

In the movement of the latches 139 to the latching position of Fig. 24 from the position shown in Fig. 25, as just described, the lever 145 and the springs 146 are in an inoperative position suggested by dotted lines in Fig. 24. While in such position the latches 139 retain the motor bracket and the motor in the position of Fig. 24, which corresponds to the high speed or planing position shown in Fig. 2. If while the motor is operating at constant or accelerating speed while the latches are in the position of Fig. 24, the lever 145 is moved from the dotted line position to the full line position shown in said figure, the latches will not be elevated from said operative position due to the resistance to such movement exerted by the pressure of the latches against the rod 135 and the tension of the springs 141. Hence, during such operation of the boat with the latches in operative position, the lever can be swung to the operative full line position of Fig. 24 without effecting the elevation of the latches. When the lever has been swung to such operative position, the tension lines of the springs 146 pass below the pivotal axis defined by the inturned ends of arms 144 of the lever 145 and tend to hold the lever in the spring loaded position shown in full lines but without elevating the latches 139 so long as the thrust of the motor exerts normal pressure of the latches against the rod 135. Should the operator be required to slow down the boat while operating it at the high speed planing relation described and so reduces the fuel feed to the motor, such holding pressure of the latches against the rod 135 will be released, whereupon the springs 146 will lift the latches against the action of springs 141, the springs 146 being sufficiently strong to accomplish that result. The lifting force exerted by the springs 146 is but slightly greater than the opposing force exerted on the latches by the springs 141, but is sufficient to elevate the latches sufficiently to move the cam surfaces 139a into contact with the upper left-hand quadrant of the rod 135 (as viewed in Fig. 24) and as the full feed is again restored to the motor, the action of the propeller will swing the motor 129 and the bracket 128 clockwise about the stop bar 133 and shift the bracket arms 134 to the right to the position shown in Fig. 25 and in so doing elevate the latches 139 to the position shown in Fig. 25. As the ends of the springs 146 carried by the studs 147 pass above the plane of the lever 145 and the inturned ends of arms 144, the springs 146 will swing the lever to the inoperative position shown in Fig. 25.

It will be seen that in use of the mechanism shown in Figs. 23–25, the operator starts the motor while in the inclined or low speed position of Fig. 25 which corresponds to the position of the motor relative to the boat shown in Fig. 1. As the speed of the boat increases to the velocity at which the boat begins to plane, the operator can cause the motor to shift angularly relative to the boat by reducing the fuel feed to the motor momentarily whereupon the drag on the propeller and the portion of the motor casing within the water plus the action of the tensioned springs 137 will swing the motor to the position of Fig. 24 which corresponds to the position shown in Fig. 2. The latch springs 141 thereupon will swing the latches to the latching position shown in Fig. 24 and the motor will be retained in the high speed position when the former fuel feed is restored. The reduction in the fuel feed for effecting the described shift in angular position of the motor requires only an instant and thus without substantial loss of velocity of the boat. Thereafter the operator may swing the lever 145 from the inoperative position to the operative position shown in full lines in Fig. 24 to ready the mechanism for automatic release of the latches to enable the motor and propeller to resume the position of Fig. 1. When the lever is so positioned and the fuel feed is again reduced for effecting momentary lessening of the pressure of the latches against the rod 135, the springs 146 elevate the latches from latching positions and enable the mechanism to return to the relative position of the parts shown in Fig. 25. The setting of the lever 145 to the full line position of Fig. 24 merely conditions the mechanism for automatic return to the position of Fig. 25, but until the lever is so set the mechanism will remain in the position shown in Fig. 24.

In all the forms of the invention illustrated, means are provided for changing the thrust angle of the propeller to a more advantageous angle when the boat has acquired a velocity at which it planes. It will be apparent that variations in the forms of the illustrated structure may be resorted to and hence I do not wish to be restricted specifically to the described mechanisms except as so limited by the appended claims.

I claim:

1. In combination, an outboard motor having a driven propeller, a clamp for securing the motor to a boat, a pivot connecting the clamp and the motor for accommodating forward and rearward tilting movement of the motor and propeller relative to the clamp, a stop member carried by the clamp at an elevation lower than said pivot and against which the motor is adapted to abut during boat propelling operations, and means accommodating forward and rearward relative shifting movement of said pivot for effecting tilting movement of the motor and propeller about said stop member for varying the thrust angle of the propeller relative to the driven boat.

2. In combination, an outboard motor having a driven propeller, a clamp for securing the motor to a boat, a pivot connecting the clamp and the motor for accommodating forward and rearward tilting movement of the motor and propeller relative to the clamp, a stop member carried by the clamp at an elevation lower than said pivot and against which the motor is adapted to abut during boat propelling operations, means accommodating forward and rearward relative shifting movement of said pivot for effecting tilting movement of the motor and propeller about said stop member for varying the thrust angle of the propeller relative to the driven boat, and a manually releasable latch member for latching said pivot in one said position.

3. In combination, an outboard motor provided with a propeller and a clamp for attaching the motor to a boat to be driven, a pivot connecting the motor to the clamp and accommodating forward and rearward swinging movement of the motor and propeller relative to the boat about a horizontal axis, an adjustable stop carried by the clamp for arresting forward swinging movement of the motor in boat driving positions, and means accommodating shifting of said pivot between forward and rear positions and in each of which positions said pivot cooperates with said stop for determining a driving position of the motor and propeller differing in angularity with respect to the boat from the other driving position.

4. In combination, an outboard motor having a propeller and a clamp for attaching the motor to a boat to be driven, means comprising a horizontal pivot attaching the motor to the clamp for swinging movement of the motor and propeller in a vertical plane, said clamp being provided with a stop for arresting forward swinging movement of the motor about said pivot, said clamp having a slot receiving said pivot and accommodating shifting of the pivot therein forwardly and rearwardly between rear and forward positions, respectively, for enabling the motor to tilt about said stop between rearward and forward operating positions for altering the direction of the propeller thrust, and a manually releasable spring activated latch on the clamp for engaging the pivot in one of said positions for retaining the motor and propeller in the corresponding operating position.

5. In combination, an outboard motor having a propeller and a clamp for attaching the motor to a boat to be driven, means comprising a horizontal pivot attaching the motor to the clamp for swinging movement in a vertical plane, said clamp being provided with a stop for arresting forward swinging movement of the motor about said pivot, and means accommodating relative shifting movement of the pivot between forward and rear positions for enabling the motor to rock about said stop between rearward and forward boat driving positions, respectively, for altering the direction of the propeller thrust with respect to the driven boat.

6. In combination, an outboard motor having a propeller and a clamp for attaching the motor to a boat to be driven, said motor and clamp being provided with a horizontal pivot and a recess receiving the pivot for operatively connecting the motor and clamp and accommodating swinging movement of the motor in a vertical plane, said recess being elongated to accommodate relative shifting of the pivot therein between forward and rear positions, and a stop member carried by the clamp for arresting forward swinging movement of the motor and propeller about the pivot as an axis when the pivot is in either said forward or rear position and cooperating with the pivot in each of said positions for arresting forward swinging movement of the motor and propeller in different operative positions of angularity with respect to the boat.

7. In combination, an outboard motor having a propeller and a clamp for attaching the motor to a boat to be driven, said motor and clamp being provided with a horizontal pivot and a receiving recess therefor for operatively connecting the motor and clamp and accommodating swinging movement of the motor in a vertical plane, said recess being elongated for accommodating relative shifting of the pivot therein between forward and rear positions, a stop member carried by the clamp for engagement by and arresting forward swinging movement of the motor about the pivot and cooperating with the pivot when in the rear position within said recess for determining one angular working position of the motor and propeller with respect to the boat, said stop member cooperating with the pivot when in said forward position within the recess for determining a second working position of the motor and propeller with respect to the boat, and a spring urged latch for engaging said pivot and securing the motor in the last named working position.

8. In combination, an outboard motor having a propeller and a clamp for attaching the motor to a boat to be driven, said motor and clamp being provided with a horizontal pivot and a receiving recess therefor for operatively connecting the motor and clamp and accommodating swinging movement of the motor in a vertical plane, said recess being elongated for accommodating shifting of the pivot therein between forward and rear positions, a stop member carried by the clamp for engagement by and arresting forward swinging movement of the motor about the pivot and cooperating with the pivot when in the rear position within said recess for determining one angular working position of the motor and propeller with respect to the boat, said stop member cooperating with the pivot when in said forward position within the recess for determining a second working position of the motor and propeller with respect to the boat, and spring means tending to swing the motor angularly about said stop means for moving said pivot relatively to said forward position within the recess.

9. In combination, an outboard motor having a driven propeller, a motor supporting bracket secured to the motor, a mounting clamp for securing the bracket and motor to a boat and provided with a stop, said clamp and bracket having inter-engaging means comprising a horizontal pivot rod carried by one of said members and a portion of the other member provided with a horizontal slot through which said rod passes and accommodating sliding movement of the bracket relative to the clamp as the motor rocks about said stop as a pivot between two limiting boat driving positions, and latch means for latching the bracket to the clamp against such sliding movements for preventing forward tilting movement of the motor and propeller about said stop beyond one of said boat driving positions.

10. In combination, an outboard motor having a driven propeller, a motor supporting bracket secured to the motor, a mounting clamp for securing the bracket and motor to a boat and provided with a stop, said clamp and bracket having inter-engaging means comprising a horizontal pivot rod carried by one of said members and a portion of the other member provided with a horizontal slot through which said rod passes and accommodating sliding movement of the bracket relative to the clamp as the motor rocks about said stop as a pivot between two limiting boat driving positions, and latch means for latching the bracket to the clamp against such sliding movement for preventing forward tilting movement of the motor and propeller about said stop beyond one of said boat driving positions, said latch means comprising spring pressed latch members carried by the bracket and engageable with said rod.

11. In combination, an outboard motor having a driven propeller, a motor supporting bracket secured to the motor, a mounting clamp for securing the bracket to a boat and provided with a stop arresting forward swinging movement of the motor, said clamp and bracket being provided with interconnecting means comprising a pivot rod carried by one of said members and arms carried by the other member provided with horizontal slots through which said rod passes for accommodating swinging movement of the motor and relative sliding movement of the rod within the slot to enable the motor and propeller to rock about said stop as an axis between a forward and a rearward boat driving position, tensioned springs connecting said rod and bracket and tending to swing the same and said motor and propeller about said stop to said rearward driving position, spring pressed latch means for engaging the rod for latching the same in the rearward position within the slots and cooperating with said stop in restraining forward swinging movement of the motor and propeller from said rearward boat driving position, and automatically operable means for moving said latch means from latching position upon reduction in the rate of fuel feed to the motor resulting in termination of forward driving thrust of the propeller for enabling said motor and propeller to rock about said stop to the forward driving position upon resumption of said rate of fuel feed.

12. In combination, an outboard motor having a driven propeller, said motor being pivotally mounted on a boat for swinging movement of said propeller between a forward and rearward position for varying the thrust angle of said propeller relative to said boat, spring means between said boat and said motor tending to force said propeller toward said rearward position, said spring means being operative upon reduction of thrust of said propeller, while said boat is being driven, to effect a movement of said propeller to said rearward position, and latch means between said boat and said motor for automatically holding said propeller in said rearward position when said propeller reaches said rearward position due to said movement.

13. In combination, an outboard motor having a driven propeller, said motor being pivotally mounted to a boat for swinging movement of said propeller between a forward and rearward position for varying the thrust angle of the propeller relative to the driven boat, latch means between said motor and said boat for holding said propeller in said rearward position against the thrust of said propeller while said boat is being driven, and means connected between said latch means and said motor for automatically releasing said latch means upon reduction of thrust of said propeller to release said motor so that the propeller will pivot to said forward position due to the thrust of said propeller.

14. In combination, an outboard motor provided with a propeller and a clamp for attaching the motor to a boat to be driven, said motor being pivotally mounted on said clamp for swinging movement of said propeller between a forward and a rearward position for varying the thrust angle of said propeller relative to said boat, spring means between said clamp and said motor tending to force said propeller to said rearward position, the force of said spring means being insufficient to maintain said propeller in said rearward position while said boat is being driven by said motor, said spring means being operative upon reduction of thrust of said propeller to effect movement of said propeller to said rearward position, and latch means between said clamp and said motor for automatically holding said propeller in said rearward position.

15. In combination, an outboard motor provided with a propeller and a clamp for attaching the motor to a boat to be driven, said motor being pivotally mounted on said clamp for swinging movement of said propeller between a forward and a rearward position for varying the thrust angle of said propeller relative to said boat, a spring between said clamp and said motor tending to force said propeller to said rearward position, the force of said spring being insufficient to maintain said propeller in said rearward position against the thrust of said propeller while said boat is being driven by said motor, said spring being operative upon reduction of thrust of said propeller to effect a movement of said propeller to said rearward position, and a spring pressed latch operative to automatically hold said propeller in position when said propeller reaches said rearward position due to said movement.

16. In combination, an outboard motor having a driven propeller, said motor being pivotally mounted on a boat for varying the thrust angle of said propeller relative to said boat, power means connected between said motor and said boat responsive to a reduction of thrust of said propeller to effect movement of said propeller from a first thrust angle to a second thrust angle, and latch means operative to hold said propeller at said second thrust angle.

17. The combination of claim 16, wherein said latch means is operative to hold said propeller at said second thrust angle during subsequent increase of thrust of said propeller, and means operable for automatically releasing said latch means in response to a subsequent reduction of thrust of said propeller to effect return movement of said propeller to said first thrust angle upon later increase of thrust of said propeller.

18. In combination, an outboard motor having a driven propeller, said motor being mounted on a plate, said plate pivotally mounted on the transom of a boat for swinging movement of said propeller between a forward and rearward position for varying the thrust angle of said propeller relative to said boat, spring means between said transom and said plate tending to force said propeller toward said rearward position, said spring means being operative upon reduction of thrust of said propeller, while said boat is being driven, to effect a movement of said propeller to said rearward position, and latch means between said transom and said plate for automatically holding said propeller in said rearward position.

References Cited in the file of this patent

UNITED STATES PATENTS

| | | |
|---|---|---|
| 1,166,749 | Dougherty | Jan. 4, 1916 |
| 2,127,744 | Linthwaite | Aug. 23, 1938 |